US011620754B2

(12) United States Patent
Rivard et al.

(10) Patent No.: US 11,620,754 B2
(45) Date of Patent: Apr. 4, 2023

(54) SYSTEM, METHOD, AND COMPUTER PROGRAM FOR ADJUSTING IMAGE CONTRAST USING PARAMETERIZED CUMULATIVE DISTRIBUTION FUNCTIONS

(71) Applicant: Duelight LLC, Sunnyvale, CA (US)

(72) Inventors: William Guie Rivard, Menlo Park, CA (US); Brian J. Kindle, Sunnyvale, CA (US); Adam Barry Feder, Mountain View, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

(21) Appl. No.: 17/696,717

(22) Filed: Mar. 16, 2022

(65) Prior Publication Data
US 2022/0343509 A1 Oct. 27, 2022

Related U.S. Application Data

(63) Continuation of application No. 16/552,649, filed on Aug. 27, 2019, now Pat. No. 11,308,626, which is a
(Continued)

(51) Int. Cl.
*G06T 7/143* (2017.01)
*G06F 17/18* (2006.01)
(Continued)

(52) U.S. Cl.
CPC .............. *G06T 7/143* (2017.01); *G06F 17/18* (2013.01); *G06T 3/4007* (2013.01); *G06T 5/008* (2013.01);
(Continued)

(58) Field of Classification Search
CPC ......... G06T 3/4007; G06T 5/008; G06T 5/40; G06T 7/11; G06T 7/143; G06T 2207/20021; G06F 17/18
See application file for complete search history.

(56) References Cited

U.S. PATENT DOCUMENTS

| 5,384,904 A | 1/1995 | Sprague et al. |
| 5,872,867 A | 2/1999 | Bergen |
(Continued)

OTHER PUBLICATIONS

Sherrier et al., "Regionally Adaptive Histogram Equalization of the Chest", IEEE Transactions on Medical Imaging, vol. MI-6, No. 1, Mar. 1987, pp. 1-7 (Year: 1987).*
(Continued)

*Primary Examiner* — Nay A Maung
*Assistant Examiner* — Jose M Torres
(74) *Attorney, Agent, or Firm* — Zilka-Kotab, P.C.

(57) ABSTRACT

A system and method are provided for optimizing histogram cumulative distribution function curves. In use, a first cumulative distribution function for a first histogram of a first pixel region of a first image is computed, and a first set of parameters for the first cumulative distribution function is extracted. A second cumulative distribution function for a second histogram of a second pixel region of the first image is computed, and a second set of parameters for the second cumulative distribution function is extracted. An interpolated cumulative distribution function comprising interpolated parameters calculated by interpolating between the first set of parameters and the second set of parameters is created. Additionally, a first equalized pixel in a second image based on a first input pixel in the first image and the interpolated cumulative distribution function is generated.

16 Claims, 13 Drawing Sheets

Related U.S. Application Data continuation of application No. 16/221,289, filed on Dec. 14, 2018, now Pat. No. 11,113,821.

(60) Provisional application No. 62/608,390, filed on Dec. 20, 2017.

(51) Int. Cl.
*G06T 3/40* (2006.01)
*G06T 7/11* (2017.01)
*G06T 5/40* (2006.01)
*G06T 5/00* (2006.01)

(52) U.S. Cl.
CPC .................. *G06T 5/40* (2013.01); *G06T 7/11* (2017.01); *G06T 2207/20021* (2013.01)

(56) References Cited

U.S. PATENT DOCUMENTS

| | | | |
|---|---|---|---|
| 6,442,294 | B1 | 8/2002 | Nishizawa et al. |
| 6,650,774 | B1 | 11/2003 | Szeliski |
| 7,783,126 | B2 | 8/2010 | Yamashita et al. |
| 7,949,201 | B2 | 5/2011 | Suzuki |
| 7,953,286 | B2 | 5/2011 | Chiang et al. |
| 8,228,560 | B2 | 7/2012 | Hooper |
| 8,774,553 | B1 * | 7/2014 | Winn ............... G06T 5/008 382/168 |
| 8,774,554 | B1 * | 7/2014 | Winn ............... G06T 5/008 382/168 |
| 8,861,886 | B2 | 10/2014 | Huo et al. |
| 9,292,911 | B2 | 3/2016 | Paris et al. |
| 9,418,408 | B1 | 8/2016 | Thompson |
| 9,716,880 | B2 | 7/2017 | Chen et al. |
| 11,113,821 | B2 | 9/2021 | Rivard et al. |
| 11,308,626 | B2 | 4/2022 | Rivard et al. |
| 2005/0182808 | A1 | 8/2005 | Kanai |
| 2009/0110274 | A1 | 4/2009 | Atanassov et al. |
| 2009/0257683 | A1 | 10/2009 | Cloud et al. |
| 2013/0011039 | A1 | 1/2013 | Kadir et al. |
| 2019/0043176 | A1 | 2/2019 | Li et al. |
| 2019/0188857 | A1 | 6/2019 | Rivard et al. |
| 2019/0385311 | A1 | 12/2019 | Rivard et al. |

OTHER PUBLICATIONS

International Search Report and Written Opinion from PCT Application No. PCT/US2018/066293, dated Mar. 15, 2019.
Yoon et al., "Image Contrast Enhancement based Sub-histogram Equalization Technique without Over-equalization Noise," World Academy of Science, Engineering and Technology, vol. 50, 2009, 7 pages.
Kadir et al., "Non-parametric Estimation of Probability Distributions from Sampled Signals," Robotics Research Laboratory, Department of Engineering Science, University of Oxford, Jul. 4, 2005, pp. 1-22.
Rivard et al., U.S. Appl. No. 16/221,289, filed Dec. 14, 2018.
Rivard et al., U.S. Appl. No. 16/552,649, filed Aug. 27, 2019.
Non-Final Office Action from U.S. Appl. No. 16/221,289, dated May 15, 2020.
International Preliminary Examination Report from PCT Application No. PCT/US2018/066293, dated Jul. 2, 2020.
Final Office Action from U.S. Appl. No. 16/221,289, dated Nov. 24, 2020.
Notice of Allowance from U.S. Appl. No. 16/221,289, dated May 12, 2021.
Non-Final Office Action from U.S. Appl. No. 16/552,649, dated Jun. 18, 2021.
Supplemental Notice of Allowance from U.S. Appl. No. 16/221,289, dated Jul. 16, 2021.
Notice of Allowance from U.S. Appl. No. 16/552,649, dated Dec. 17, 2021.
Examination Report from Indian Application No. 202027030380, dated May 30, 2022.

* cited by examiner

SYSTEM, METHOD, AND COMPUTER PROGRAM FOR ADJUSTING IMAGE CONTRAST USING PARAMETERIZED CUMULATIVE DISTRIBUTION FUNCTIONS

CROSS-REFERENCES TO RELATED APPLICATIONS

The present application is a continuation of, and claims priority to U.S. patent application Ser. No. 16/552,649, titled "SYSTEM, METHOD, AND COMPUTER PROGRAM FOR ADJUSTING IMAGE CONTRAST USING PARAMETERIZED CUMULATIVE DISTRIBUTION FUNCTIONS," filed Aug. 27, 2019, which in turn claims priority to and the benefit of U.S. patent application Ser. No. 16/221,289, titled "SYSTEM, METHOD, AND COMPUTER PROGRAM for ADJUSTING IMAGE CONTRAST USING PARAMETERIZED CUMULATIVE DISTRIBUTION FUNCTIONS," filed Dec. 14, 2018, which in turn claims priority to and the benefit of U.S. Provisional Patent Application No. 62/608,390, titled "SYSTEM, METHOD, AND COMPUTER PROGRAM FOR OPTIMIZING HISTOGRAM CUMULATIVE DISTRIBUTION FUNCTION CURVES," filed Dec. 20, 2017, all of the foregoing applications being hereby incorporated by reference for all purposes.

FIELD OF THE INVENTION

The present invention relates to digital image processing, and more particularly to adjusting image contrast based on a parameterized cumulative distribution function.

BACKGROUND

Current digital photographic systems use histogram equalization and adaptive histogram equalization (including contrast-limited techniques) to improve perceived image detail and quality by adjusting contrast within digital images. Because adaptive histogram equalization is computationally intensive, certain approximation techniques are frequently implemented to reduce overall computational effort. One such approximation involves computing an effective cumulative distribution function (CDF) for a given pixel using bilinear interpolation between pre-computed CDFs for fixed regions within the image rather than computing a unique CDF for a region around the pixel. However, many issues can arise from using such techniques. For example, bilinear interpolation can produce visible artifacts along boundaries of the fixed regions in a resulting image. Such artifacts can become significant and degrade image quality when adjacent fixed regions have sufficiently different CDFs.

There is thus a need for addressing these and/or other issues associated with the prior art.

SUMMARY

A system and method are provided for optimizing histogram cumulative distribution function curves. In use, a first cumulative distribution function for a first histogram of a first pixel region of a first image is computed, and a first set of parameters for the first cumulative distribution function is extracted. A second cumulative distribution function for a second histogram of a second pixel region of the first image is computed, and a second set of parameters for the second cumulative distribution function is extracted. An interpolated cumulative distribution function comprising interpolated parameters calculated by interpolating between the first set of parameters and the second set of parameters is created. Additionally, a first equalized pixel in a second image based on a first input pixel in the first image and the interpolated cumulative distribution function is generated.

DETAILED DESCRIPTION

Figure 1:
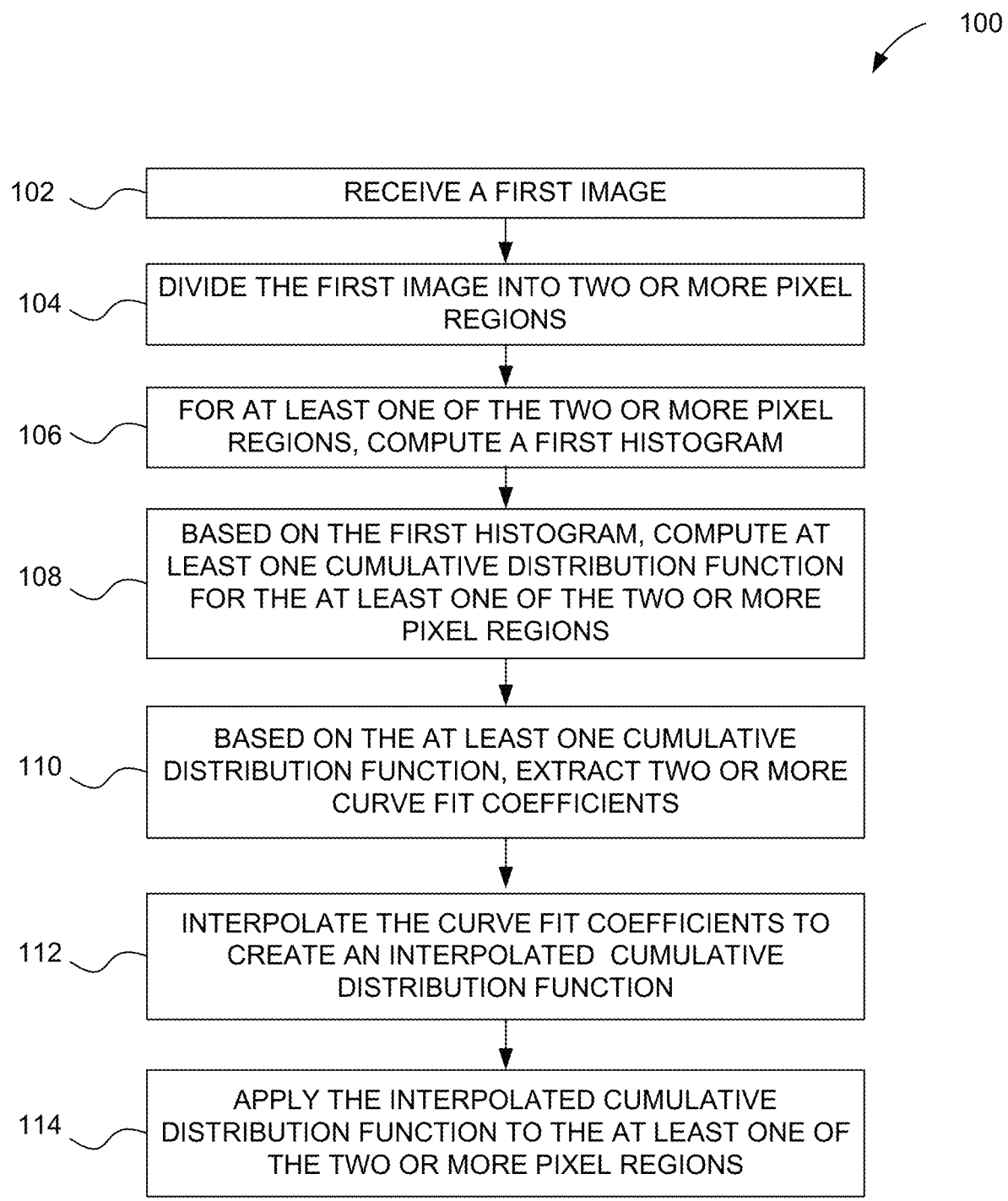
FIG. 1 illustrates an exemplary method for applying a parameterized cumulative distribution function to a pixel region, in accordance with one possible embodiment.

FIG. 1 illustrates an exemplary method 100 for applying a parameterized cumulative distribution function to a pixel region, in accordance with one possible embodiment. As shown, a first image is received (see operation 102), and the first image is divided into two or more pixel regions (see operation 104). Next, for at least one of the two or more pixel regions, a first histogram is computed (see operation 106), and based on the first histogram, at least one cumulative distribution function for the at least one of the two or more pixel regions is computed (see operation 108).

In the context of the present description, a cumulative distribution function ("CDF") comprises a normalized accumulation of histogram values from a minimum intensity value for the histogram to a maximum intensity value for the histogram. In another embodiment, any type of histogram characterization function may be used.

Based on the at least one cumulative distribution function, two or more curve fit coefficients are extracted, (see operation 110). In one embodiment, the two or more curve fit coefficients (CDF parameters) may include two or more points and two or more corresponding angles. The CDF parameters may be interpolated with respect to a second set of CDF parameters for a second pixel region to create an interpolated cumulative distribution function (see operation 112). Further, the interpolated cumulative distribution function is applied to the at least one of the two or more pixel regions (see operation 114).

In an embodiment, CDF parameters for the first pixel region may be used to represent a directly computed CDF for first pixel region. In another embodiment, a first set of CDF parameters are computed for the first pixel region and a second set of CDF parameters are computed for the second pixel region; furthermore, an interpolated CDF is computed for a given pixel based on the pixel position within the first pixel region. Any technically feasible technique may be used to interpolate between the first set of CDF parameters and the second set of CDF parameters. In yet another embodiment, CDF parameters are computed for different pixel regions comprising the first image, and an interpolated CDF for a given pixel is computed based on the pixel position, with CDF parameters of surrounding pixel regions contributing to the interpolated CDF according to distance from the pixel.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
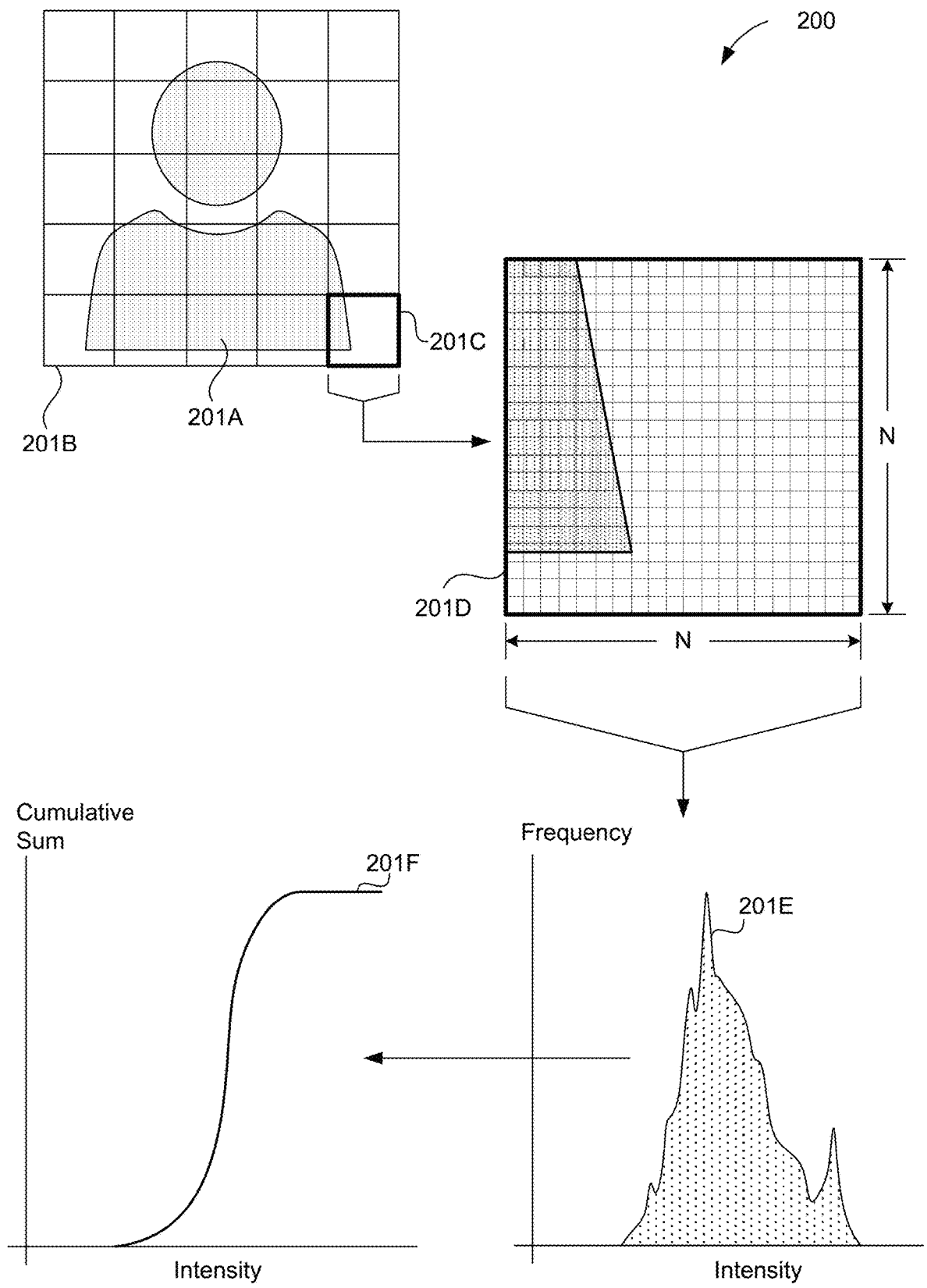
FIG. 2A illustrates a method for computing a cumulative distribution function, in accordance with one embodiment.

FIG. 2A illustrates a method 200 for computing a cumulative distribution function, in accordance with one embodiment. As an option, the method 200 may be implemented in the context of any one or more of the embodiments set forth in any previous and/or subsequent figure(s) and/or description thereof. Of course, however, the method 200 may be implemented in the context of any desired environment. Further, the aforementioned definitions may equally apply to the description below.

As shown, an image 201A may be divided into two or more pixel regions 201B. One specific pixel region 201C may be the basis for which a pixel region comprising N by N pixels may be determined (as shown in item 201D). Next, a histogram 201E is calculated for the pixel region 201C, based on, for example, intensity values of pixels within the pixel region 201C. Further, a cumulative distribution function 201F may be calculated based on the histogram 201E. The cumulative distribution function 201F may be used to equalize a pixel from the center (or any location) of pixel region 201C. In one embodiment, the pixel selected from pixel region 201C may be associated with a pre-selected location, and/or may be associated with a pixel of an object in interest. For example, a pixel within a pixel region may include an image of a pen, and an object of interest may include a tip of the pen (e.g. based on focus point, etc.) such that a pixel associated with the tip of the pen used to equalize a pixel from the center of the pixel region selected. While the disclosed technique is described with respect to square pixel regions, any shape of region may be implemented without departing the scope of the present disclosure. For example, an N by M (N not equal to M) rectangular pixel region may be used instead of an N by N square pixel region.

Figure 2B:
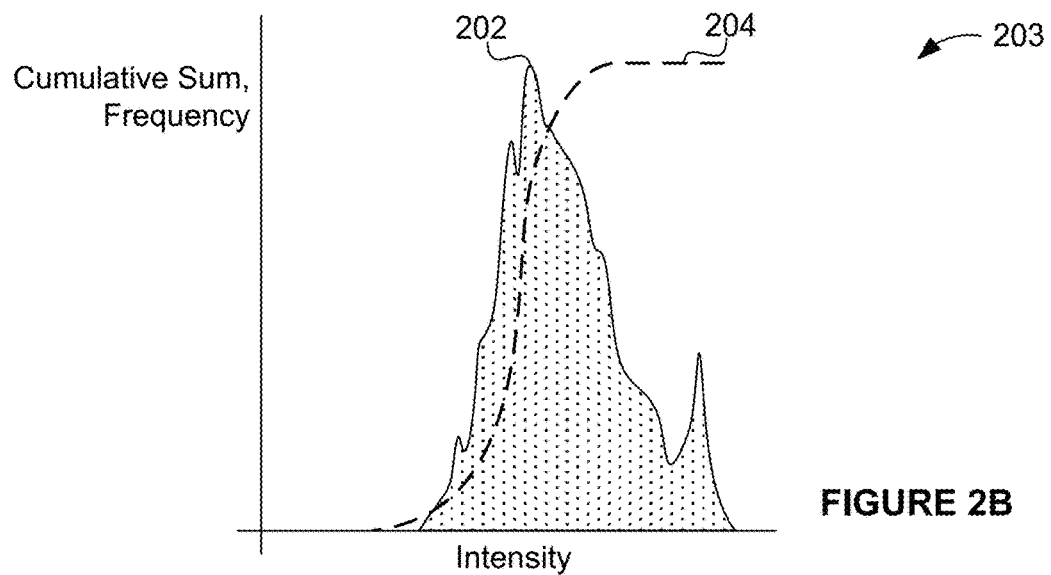
FIG. 2B illustrates a cumulative distribution function and histogram, in accordance with one embodiment.

FIG. 2B illustrates a cumulative distribution function and histogram 203, in accordance with one embodiment. As an option, the cumulative distribution function and histogram 203 may be implemented in the context of any one or more of the embodiments set forth in any previous and/or subsequent figure(s) and/or description thereof. Of course, however, the cumulative distribution function and histogram 203 may be implemented in the context of any desired environment. Further, the aforementioned definitions may equally apply to the description below.

As shown, a cumulative distribution function 204 may be generated from a histogram 202. In one embodiment, the cumulative distribution function may include an integral (accumulated sum) of histogram 202, with the area of the cumulative distribution function 204 normalized, for example to one (1.0). Additionally, as has been indicated hereinabove, another histogram characterization function may be used to equalize and/or normalize the distribution of intensity values of the histogram 202.

Figure 2C:
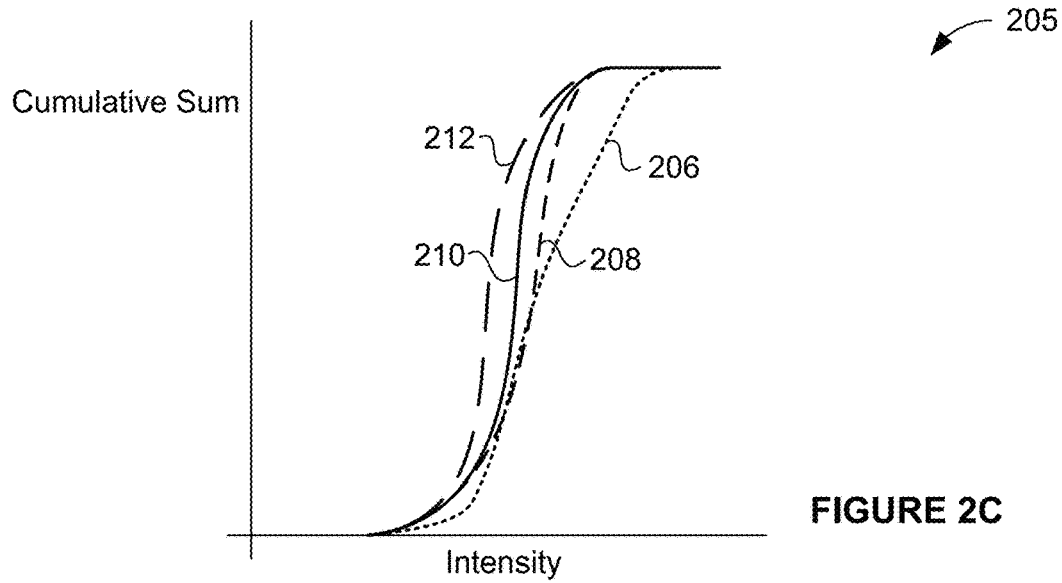
FIG. 2C illustrates multiple cumulative distribution functions, in accordance with one embodiment.

FIG. 2C illustrates multiple cumulative distribution functions 205, in accordance with one embodiment. As an option, the multiple cumulative distribution functions 205 may be implemented in the context of any one or more of the embodiments set forth in any previous and/or subsequent figure(s) and/or description thereof. Of course, however, the multiple cumulative distribution functions 205 may be implemented in the context of any desired environment. Further, the aforementioned definitions may equally apply to the description below.

As shown, the multiple cumulative distribution functions 205 may include function 206, function 208, function 210, function 212, and/or any number of additional functions. Of course, it is to be appreciated that the distributions functions 205 may include any number of functions. By construction, cumulative distribution functions may be monotonic (and/or include a non-decreasing distribution). In general, cumulative distribution functions may follow a similar shape (as shown). Consequently, approximating (modeling) a cumulative distribution function as a set of curve-fit coefficients of a curve-fit function may be relatively simple. In one embodiment, any of function 206, function 208, function 210, and/or function 212 may be used as the basis for determining curve fit coefficients for a parameterized CDF 207 (shown below). Further, one or more functions may be created based on histogram 202, and of which may be the basis for calculating the determining curve fit coefficients.

Figure 2D:
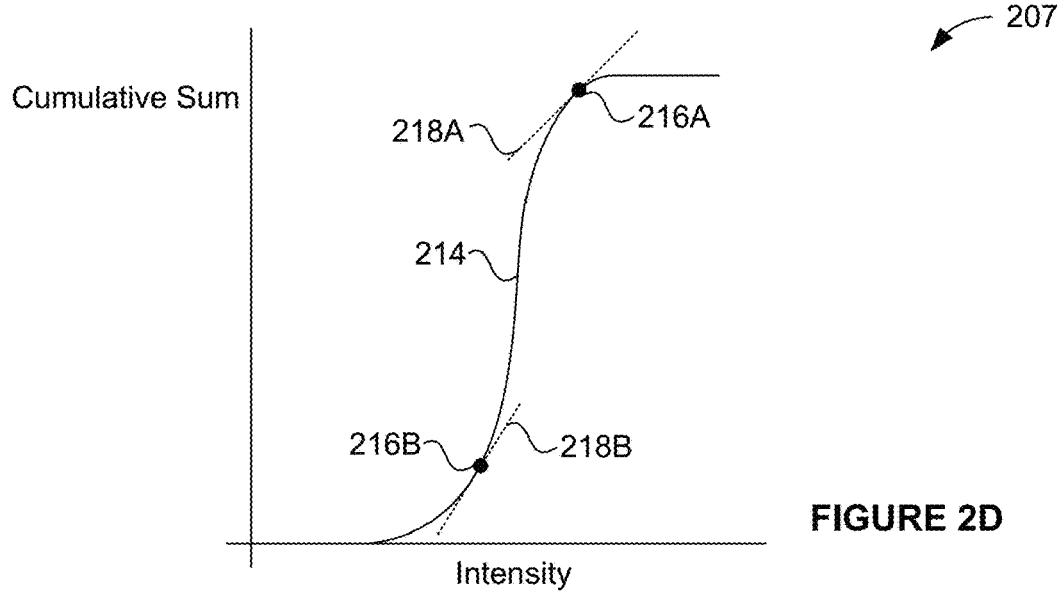
FIG. 2D illustrates a parameterized cumulative distribution function, in accordance with one embodiment.

FIG. 2D illustrates a parameterized CDF 207, in accordance with one embodiment. As an option, the a parameterized CDF 207 may be implemented in the context of any one or more of the embodiments set forth in any previous and/or subsequent figure(s) and/or description thereof. Of course, however, the a parameterized CDF 207 may be implemented in the context of any desired environment. Further, the aforementioned definitions may equally apply to the description below.

As shown, a cumulative distribution function 214 may be modeled as a parameterized CDF by a first point 216A, first angle 218A, second point 216B, and second angle 218B. In this context, the first point 216A, the first angle 218A, the second point 216B, and the second angle 218B comprise control points for an arbitrary spline curve, such a Bézier curve, an exponential function, a NURB, or any other technically feasible parameterized curve element or basis function. Furthermore, any technically feasible curve fit basis function may be implemented (e.g., B-spline, exponential, etc.). Of course, any number of points and angles may be used to create a parameterized CDF and/or interpolated CDF. In one embodiment, an increased number of points and angles may be used for a more accurate parameterized cumulative distribution function, which may require an additional computational effort. In an embodiment, at a minimum, two points and angles may be used for purposes of creating a parameterized cumulative distribution function. In this manner, the parameterized CDF may be used to more efficiently represent a CDF for a pixel region, as only a small number of control point values need be stored rather than a value for each possible intensity quantization level. Furthermore, interpolating parameters among two or more parameterized CDF functions can eliminate bilinear filtering artifacts associated with conventional techniques.

Figure 2E:
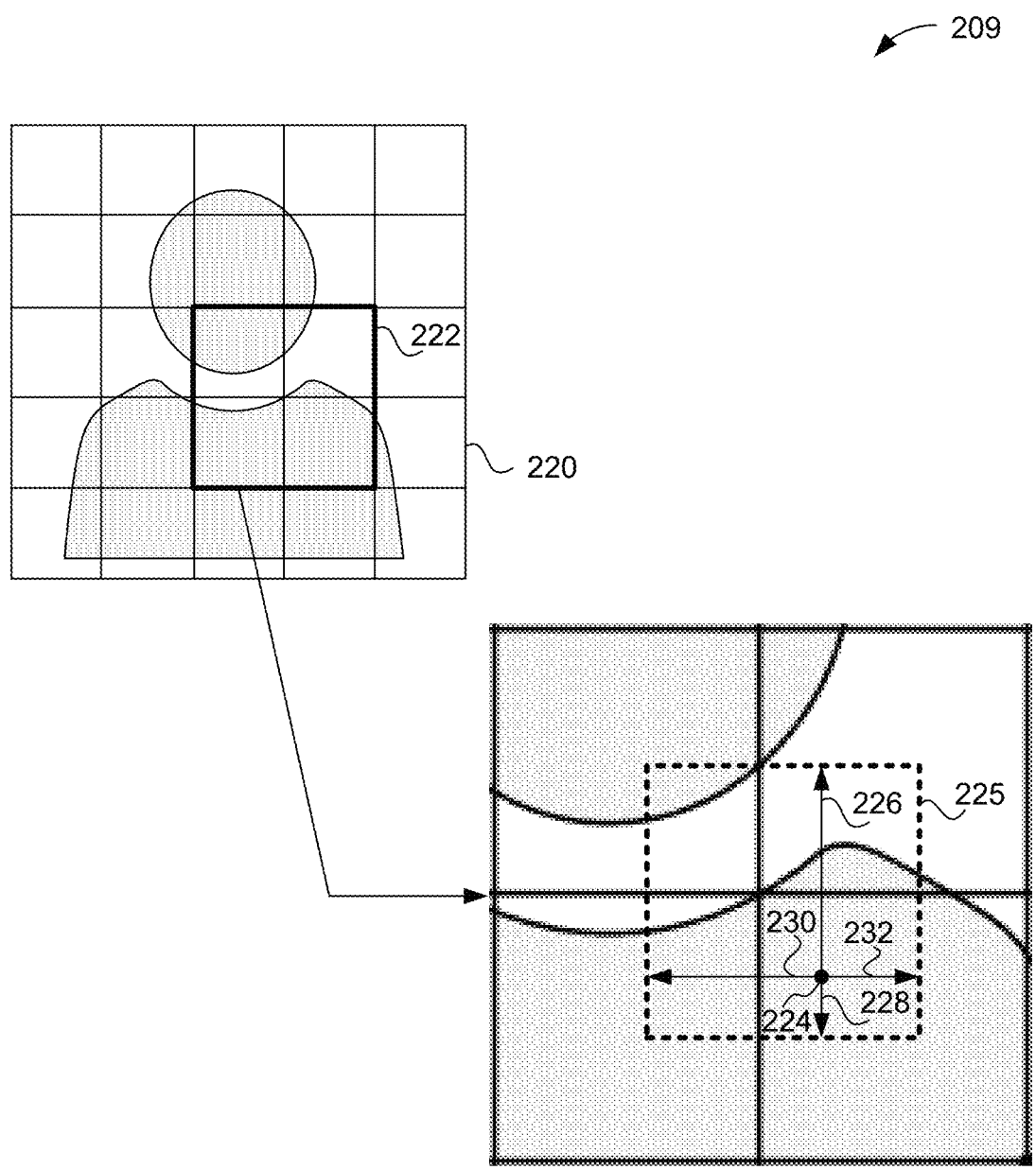
FIG. 2E illustrates interpolation based on a cumulative distribution function, in accordance with one embodiment.

FIG. 2E illustrates interpolation 209 based on a cumulative distribution function, in accordance with one embodiment. Such interpolation may be implemented to approximate individual cumulative distribution functions for individual pixels within a given pixel region. As an option, the interpolation 209 may be implemented in the context of any one or more of the embodiments set forth in any previous and/or subsequent figure(s) and/or description thereof. Of course, however, the interpolation 209 may be implemented in the context of any desired environment. Further, the aforementioned definitions may equally apply to the description below.

As shown, the interpolation 209 may be applied to a first image 220 and a first region 222 of first image 220. For a first pixel 224, a pixel region 225 around the first pixel 224 defines a first vertical distance 226 and a second vertical distance 228, as well as a first horizontal distance 230, and a second horizontal distance 232. Using the first vertical distance 226, the second vertical distance 228, the first horizontal distance 230, and the second horizontal distance 232, a corresponding interpolated CDF may be applied to the pixel 224. In an embodiment, the interpolated CDF is generated by interpolating respective parameters for parameterized CDFs of pixel regions surrounding the first pixel 224; and an equalized pixel value for the first pixel 224 is computed using the interpolated parameters in a parameterized CDF generated for the first pixel 224. In another embodiment, equalized pixels are generated for the first pixel 224 according to parameterized CDFs for surrounding pixel regions the first pixel 224; and the equalized pixels are interpolated to generate an equalized pixel value for the first pixel 224. Additionally, per FIG. 2D, the adjusted cumulative distribution function may be applied to the pixel 224 and to additional pixels comprising the first region 222 of first image 220.

For example, an interpolation of weights may be applied to the first region 222 of first image 220 based on a parameterized and interpolated CDF (as described herein). A first of multiple interpolations based on a parameterized CDF may be along the horizontal (e.g. such as first horizontal distance 230 and second horizontal distance 232). Additionally, a second of the interpolations based on the parameterized CDF may be along the vertical (e.g. such as first vertical distance 226 and second vertical distance 228). A computation for each pixel may occur whereby a corresponding interpolated CDF is applied to each pixel. Additionally, an interpolation of weights may be applied to pixels surrounding such modified pixel within the region 222 of first image 220 such that effects of a given parameterized CDF may be propagated to the surrounding pixels.

In one embodiment, depending on how close the pixel is to a border, a greater weight may be applied (for the interpolation). Additionally, an interpolation map defining parameter weights for respective parameterized CDFs may be constructed and applied, e.g. to the first pixel 224. Application of an interpolated CDF for each pixel may be used to equalize (e.g., reassign) an intensity for the first pixel 224. In such an embodiment, color and RGB values may be preserved for the first pixel 224.

In an embodiment, a set of parameterized CDFs for an image may be represented as an array of CDF parameters. For example, each different parameterized CDF corresponding to a region of the image may be represented as array of parameters stored as elements of a texture map. Each of the parameterized CDFs may be represented as curve-fit coefficients (parameters) for greater storage efficiency relative to storing a conventional CDF.

It should be noted that although the specification may reference a cumulative distribution function (CDF), an interpolated CDF, and/or a parameterized CDF, the techniques disclosed herein may equally apply to any such functions.

Still yet, equalizing a given pixel region may include modifying a contrast over a range of pixels according to pixel position and corresponding interpolated CDFs. Additionally, the cumulative distribution function may include a re-mapping for intensity values for pixel. For example, the intensity of pixel values may be adjusted for first pixel 224, and/or may be adjusted for pixels surrounding first pixel 224 within the region 222 of the first image 220 (e.g. based on weights and interpolation). In another embodiment, the intensity of pixel values may be adjusted for a range of pixels, wherein one pixel from each of a plurality of pixel regions is each adjusted.

In another embodiment, the cumulative distribution function may be applied to a subset of an image. For example, it may be determined that an object within the image is of high priority (e.g. a face, a building, etc.) and equalization using interpolated CDFs may be applied directly to the pixel region associated with the high priority object. In one embodiment, the priority ascribed to a particular object may be predetermined, and in some instances, provided by user input (e.g., by selecting a point of interest of object type of interest). Additionally, artificial intelligence may be applied to determine one or more parts (or objects) of interest in an image to extract or use as a basis for the cumulative distribution function.

A pixel region (such as first pixel region 222) may comprise multiple pixels. In another embodiment, a pixel region may be determined based on a selected pixel. In a first step, a histogram is computed for a given pixel region. As an example, if an image was divided into twenty pixel regions, twenty histograms would be computed. In a second step, a cumulative distribution function is computed for each pixel region. Using the same example, for twenty pixel regions, twenty parameterized CDFs would be computed from respective cumulative distribution functions. In contrast to conventional methods and systems, a parameterized cumulative distribution function provides for both a more compact representation for storage and may inherently eliminate bilinear interpolation artifacts due to slope matching properties of parameterized curves including, without limitation, Bézier curves and NURBs.

In one embodiment, an interpolated CDF may include interpolated curve-fit coefficients from a two-by-two pixel region of N-by-N pixels each. An individual interpolated CDF may be applied to equalize an individual pixel by generating an interpolated CDF at the pixel location. Alternatively, a pixel may be equalized by four different curve-fit cumulative distribution functions, with the resulting four equalized pixel values interpolated to form a final value for the pixel. Any technically feasible technique may be used to map a pixel value to an equalized pixel value; for example, techniques known in the art may be applied to perform pixel equalization using the presently disclosed technique of generating a curve-fit cumulative distribution function. In an alternative embodiment, parameterized CDF parameters are interpolated using bicubic interpolation.

In one embodiment, use of the adjusted cumulative distribution function (based on the curve fit coefficients) may be used to eliminate artifacts. For example, bilinear interpolation on samples that are over-zoomed may cause artifacts such as subtle horizontal or vertical lines (e.g. shown in FIG. 5). By using the interpolated CDF, however, such artifacts may be eliminated.

In another embodiment, cumulative distribution functions may differ slightly between pixel regions (e.g. shown in FIG. 2C). Notwithstanding such differences (which may be very minor), the cumulative distribution functions may be represented by approximating such cumulative distribution functions via at least two points and at least two angles (shown in FIG. 2D). Of course, any number of points and accompanying angles may be taken. In this manner, rather than recording an entire array, a number of points and angles may be taken for each cumulative distribution function.

As such, use of curve fit coefficients to compute a parameterized CDF may include an ancillary benefit of more efficient processing of data and less memory, which in turn may require less power and preserve battery usage.

Figure 5:
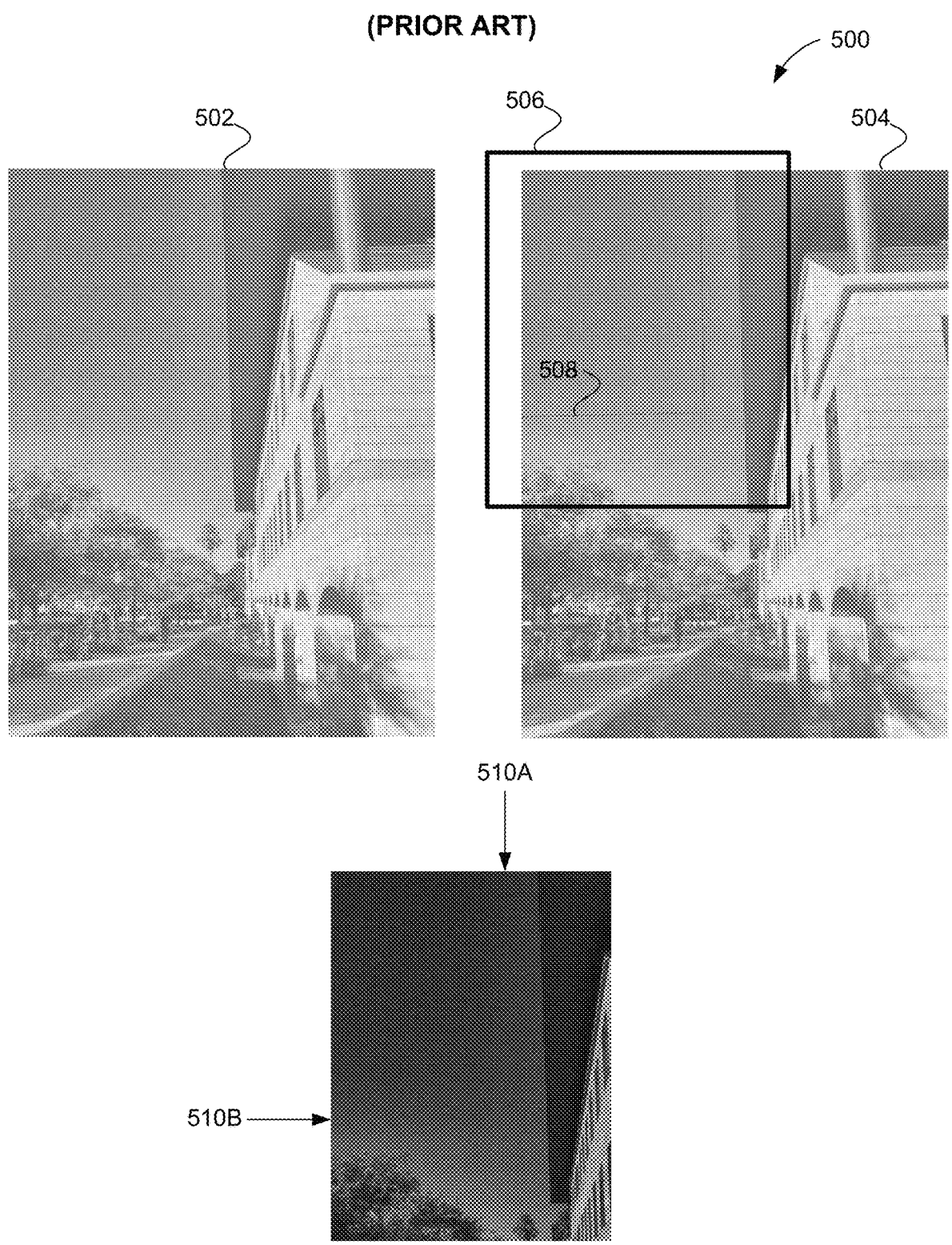
FIG. 5 illustrates bilinear interpolation artifacts.

Additionally, use of curve fit coefficients to compute a parameterized CDF may also eliminate artifacts along bilinear interpolation boundaries (e.g. shown in FIG. 5). In this manner, a typical cumulative distribution function (which may be represented as an array) may be replaced with adjusted parameterized cumulative distribution function (which may be represented as a function) that can be computed per pixel, per pixel region.

Figure 3A:
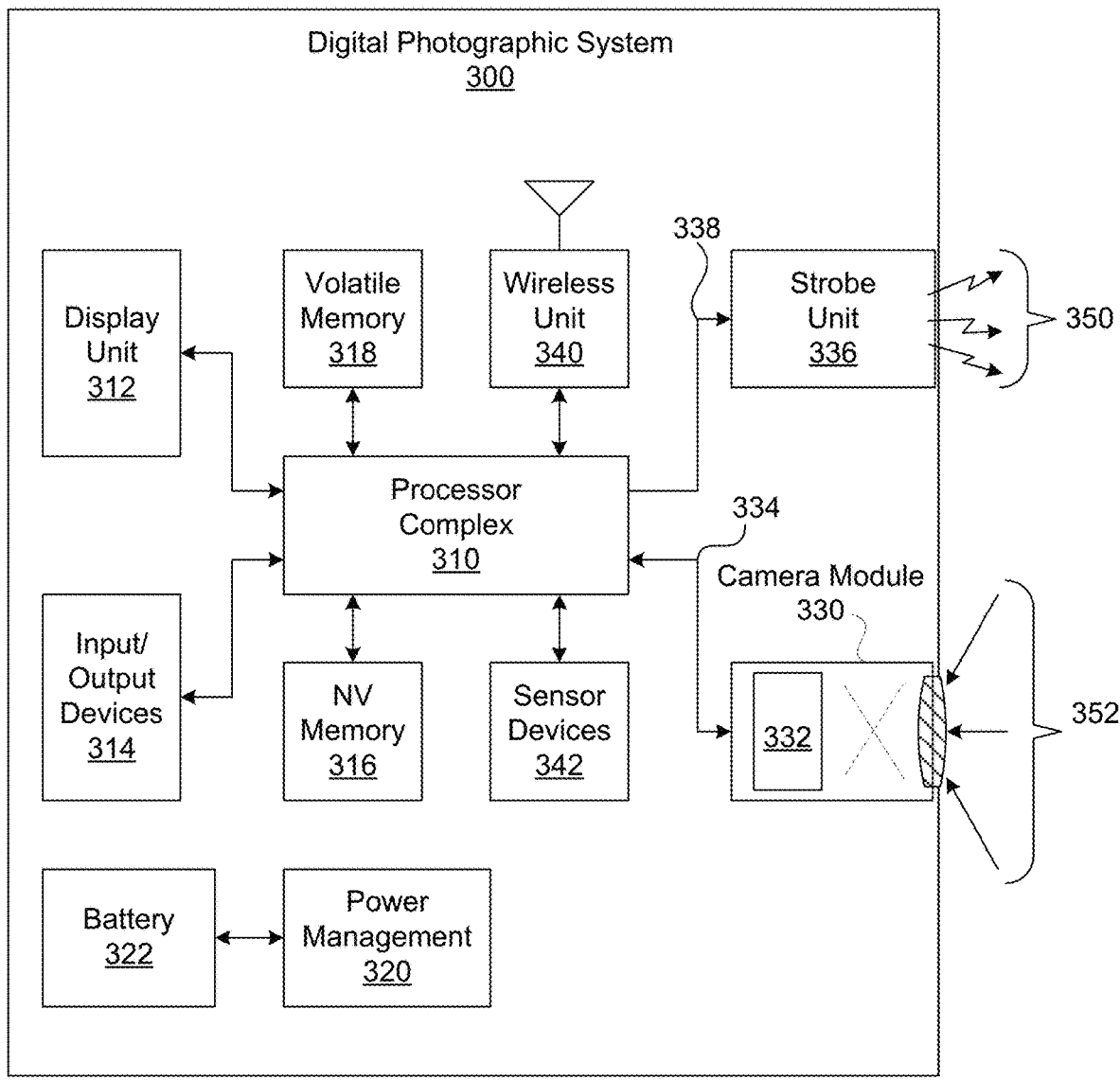
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
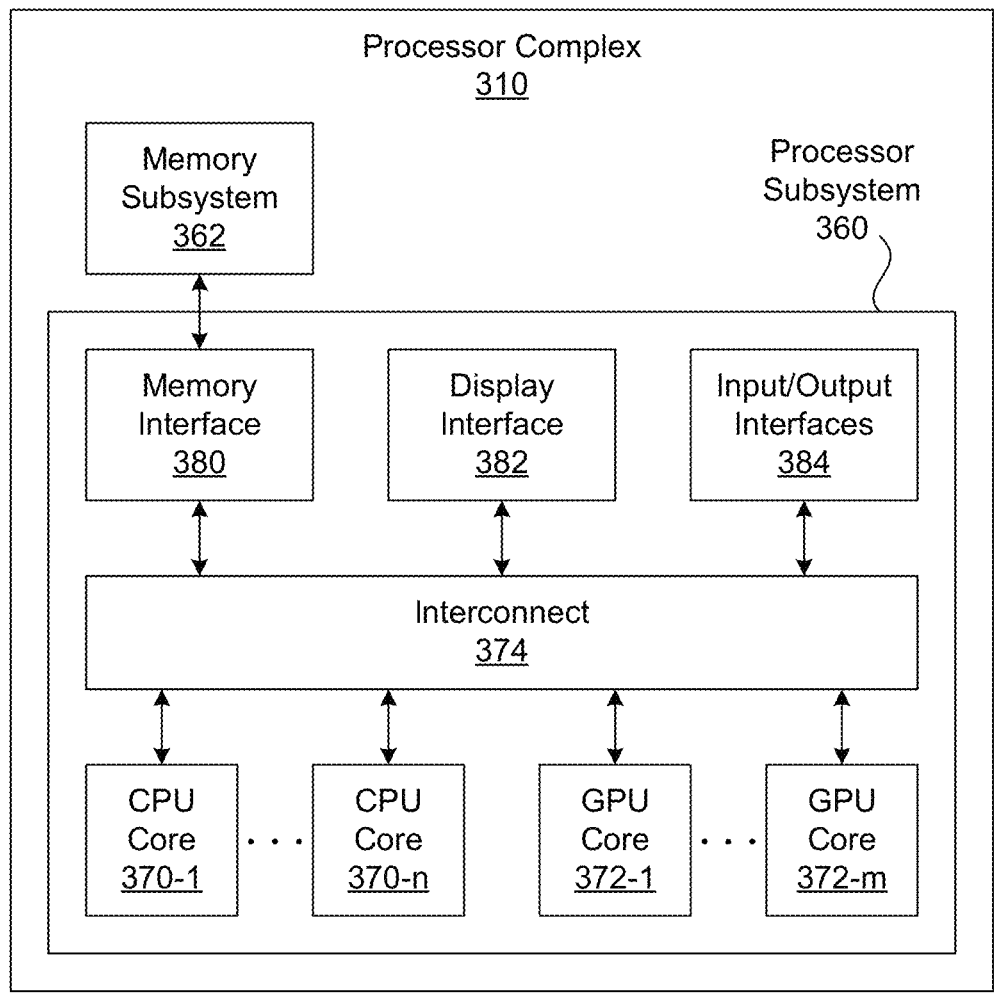
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
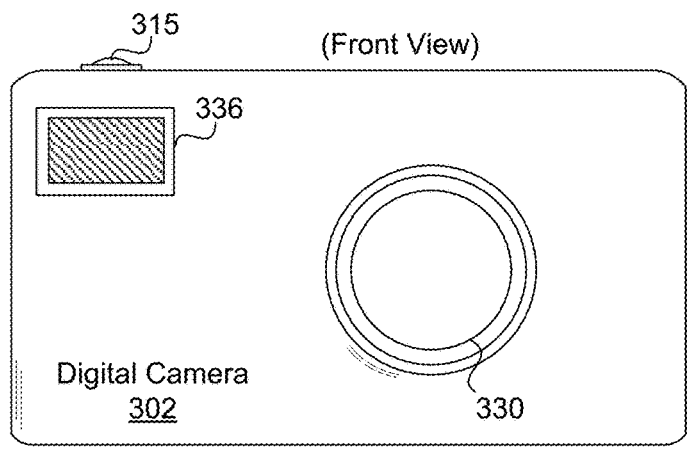
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
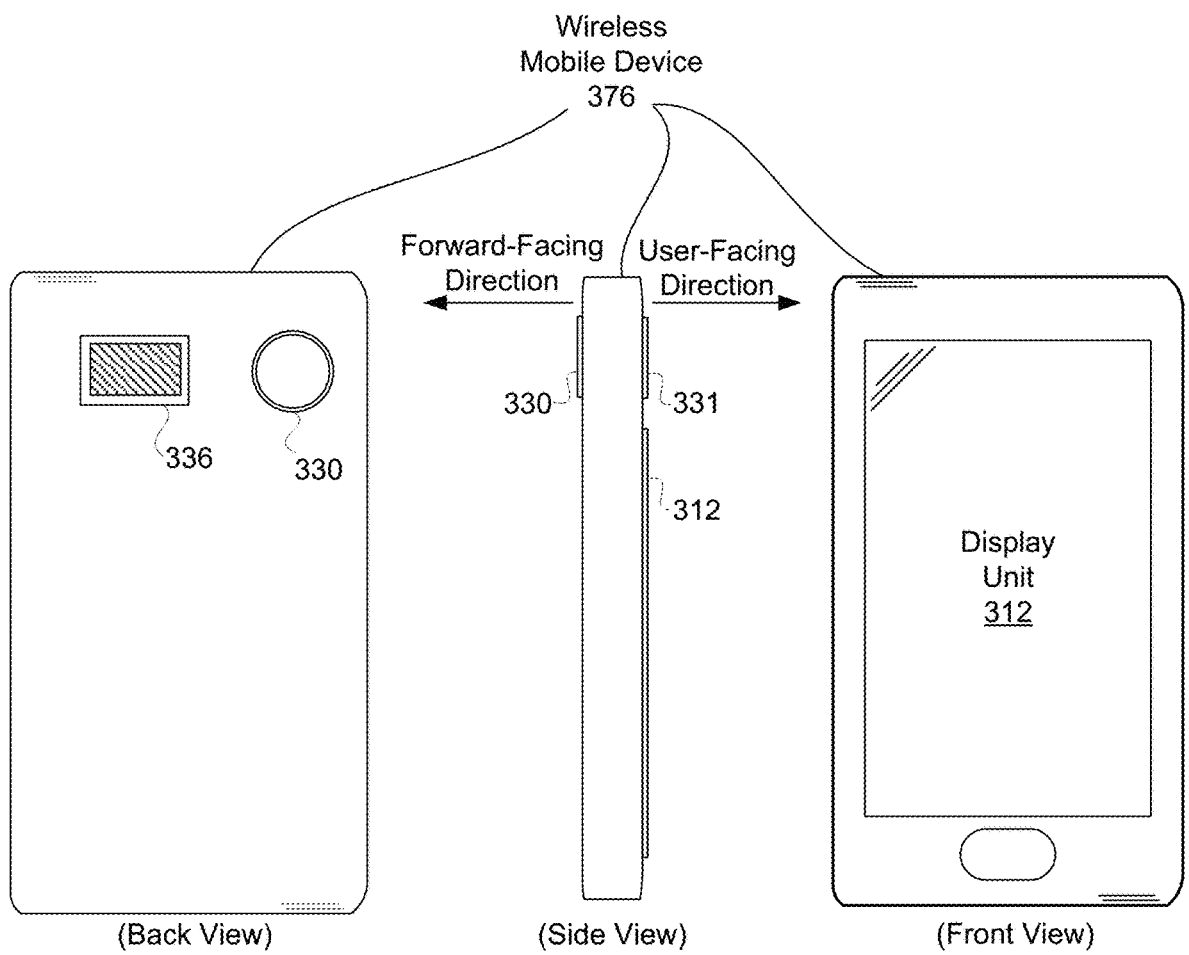
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
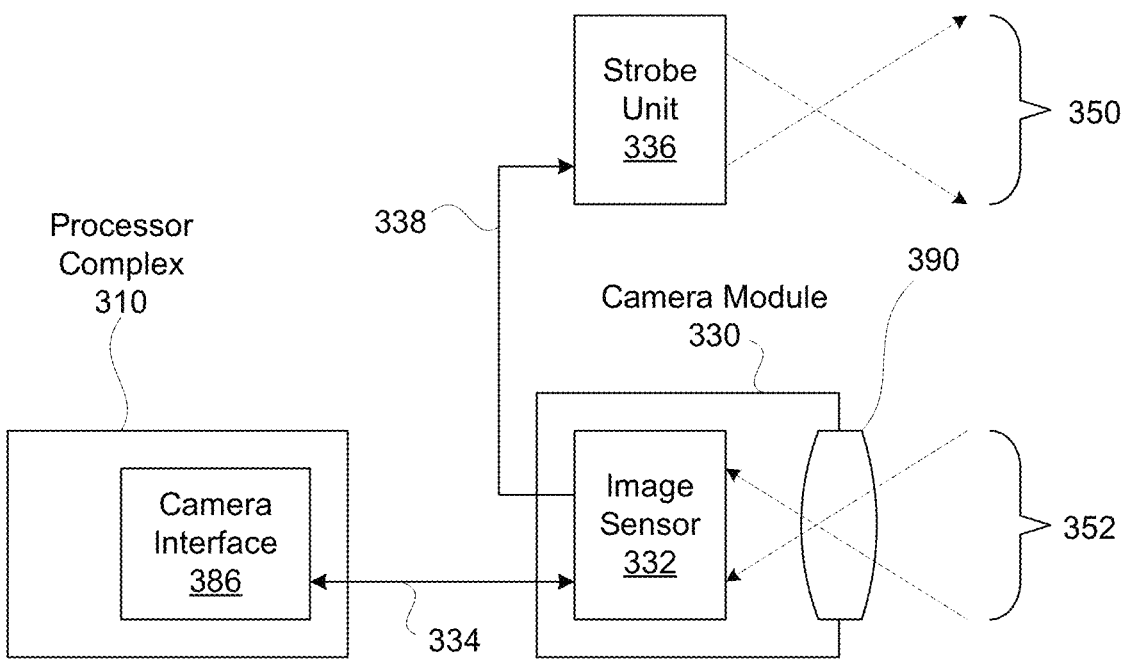
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller (e.g., controller 333 of FIG. 3G), which may be configured to generate the strobe control signal 338 in conjunction with controlling operation of the image sensor 332.

Figure 3F:
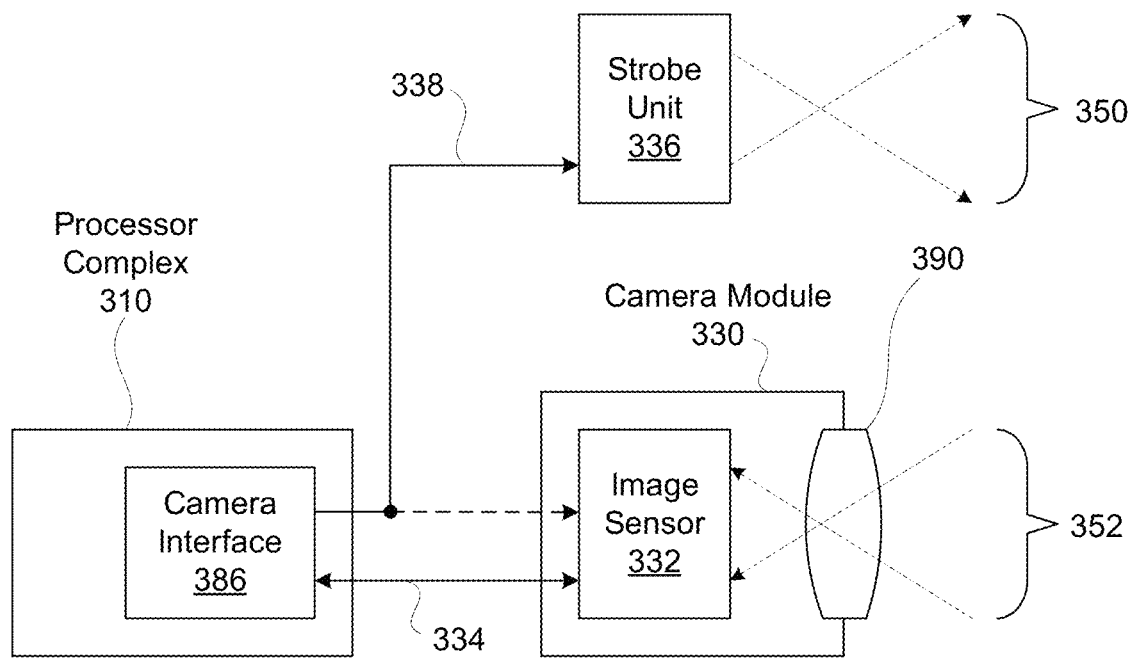
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B. The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386. In other embodiments, an image sensor controller within camera module 330 may be configured to accumulate the exposure statistics and transmit the exposure statistics to processor complex 310, such as by way of camera interface unit 386. In one embodiment, the exposure statistics are accumulated within the camera module 330 and transmitted to the camera interface unit 386, either in conjunction with transmitting image data to the camera interface unit 386, or separately from transmitting image data.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image. As with the exposure statistics, the color statistics may be presented as memory-mapped storage locations within processor complex 310. In one embodiment, the color statistics may be mapped in a memory-mapped register space, which may be accessed through interconnect 334. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386. In other embodiments, the image sensor controller within camera module 330 may be configured to accumulate the color statistics and transmit the color statistics to processor complex 310, such as by way of camera interface unit 386. In one embodiment, the color statistics may be accumulated within the camera module 330 and transmitted to the camera interface unit 386, either in conjunction with transmitting image data to the camera interface unit 386, or separately from transmitting image data.

In one embodiment, camera interface unit 386 may accumulate spatial color statistics for performing color-matching between or among images, such as between or among an ambient image and one or more images sampled with strobe illumination. As with the exposure statistics, the spatial color statistics may be presented as memory-mapped storage locations within processor complex 310. In one embodiment, the spatial color statistics are mapped in a memory-mapped register space. In another embodiment the camera module may be configured to accumulate the spatial color statistics, which may be accessed through interconnect 334. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
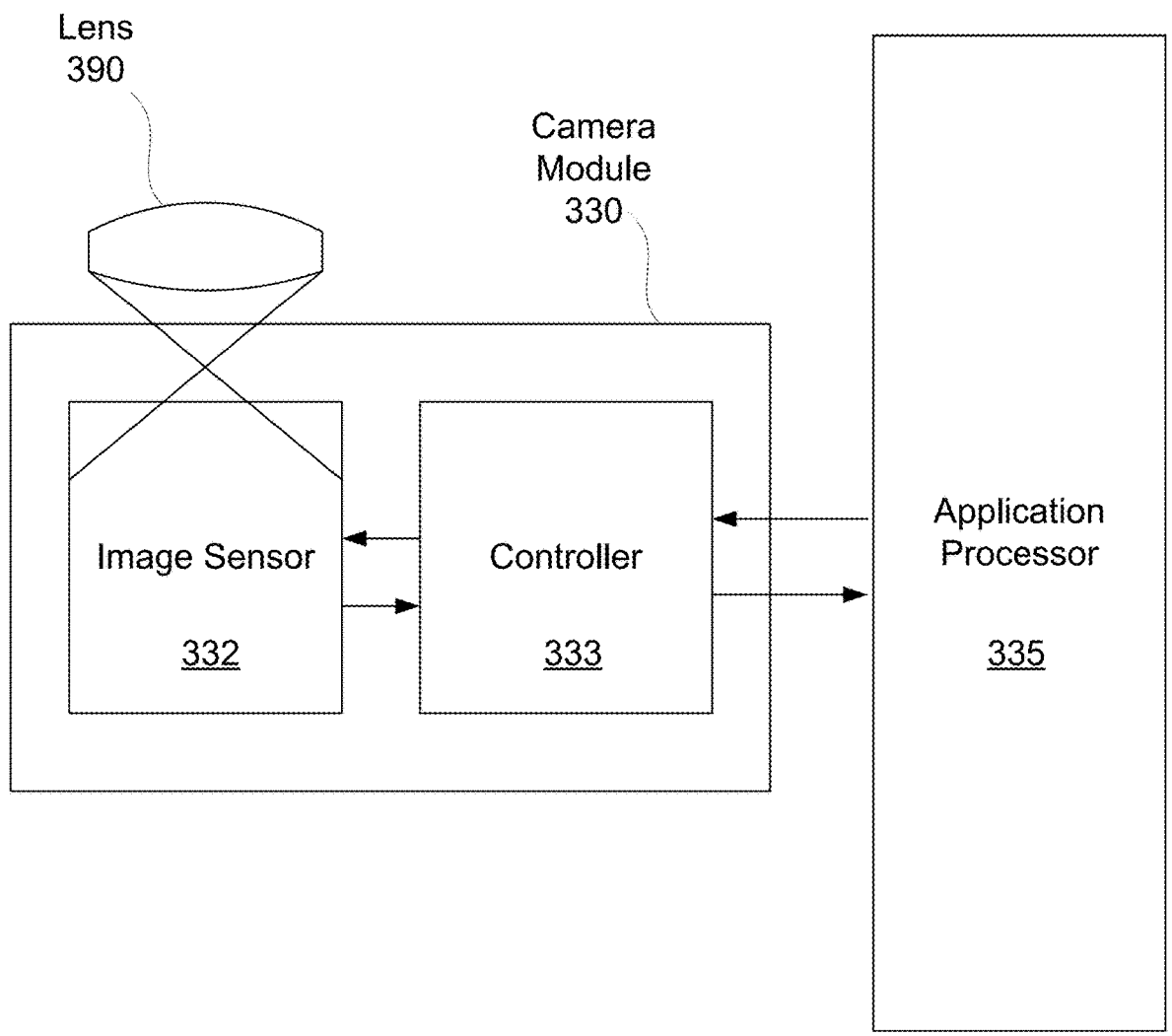
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information to be sampled onto image sensor 332. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than ten milliseconds) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system, multi-chip module, multi-chip stack, or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
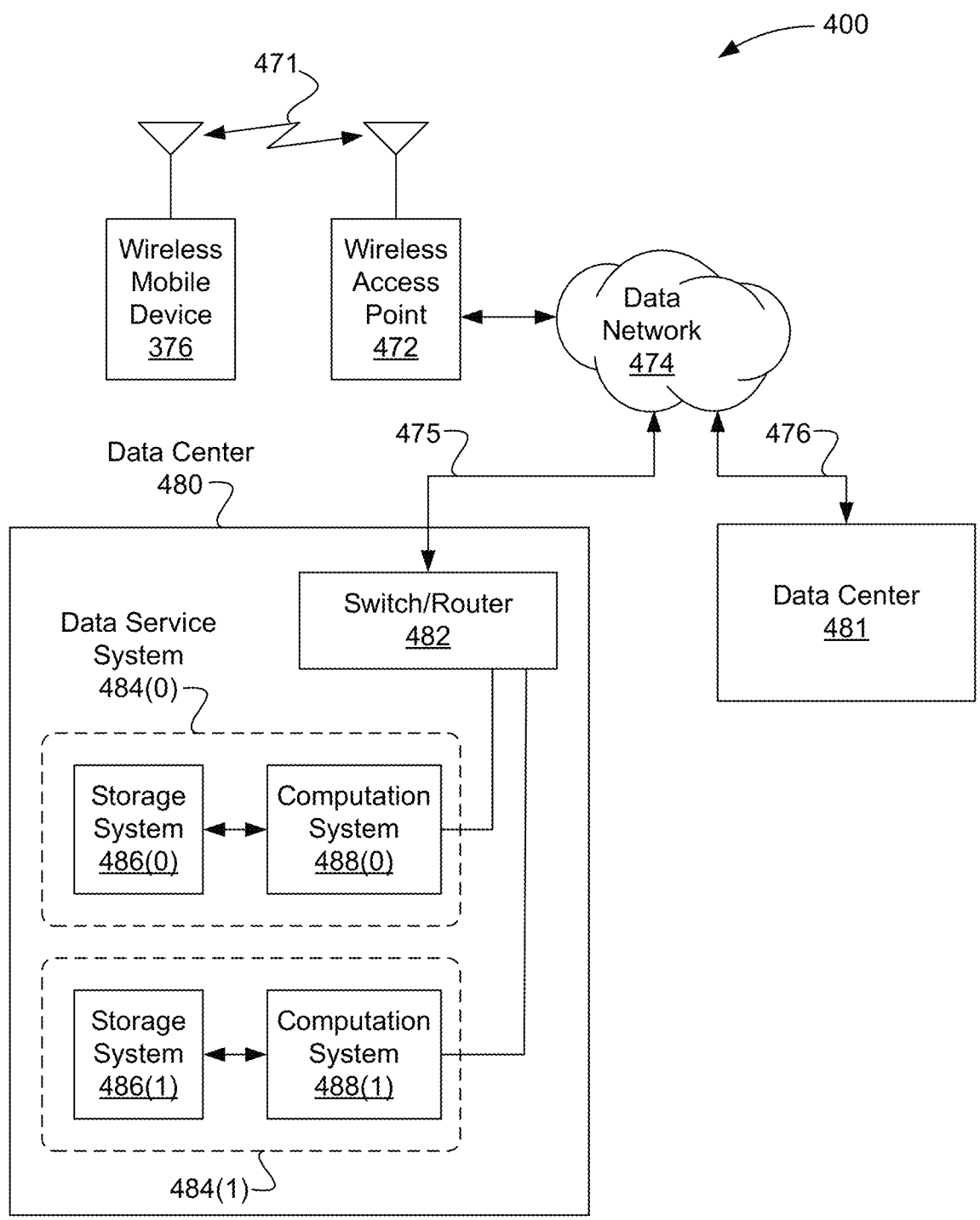
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, a data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital radio link 471 without departing the scope and spirit of the present invention. In certain embodiments, one or more of data centers 480, 481 may be implemented using virtual constructs so that each system and subsystem within a given data center 480, 481 may comprise virtual machines configured to perform data processing and network data transmission tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation scenario, wireless mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

FIG. 5 illustrates bilinear interpolation artifacts 500.

As shown, item 502 is the original image, generated using prior art local equalization techniques (CLAHE technique known in the art). Item 504 emphasizes that the artifacts are found within emphasis 506, with the actual border artifacts faintly shown along dotted line border 508. To more clearly emphasize such artifacts, mid-tones from the item 502 were adjusted towards shadows (using levels adjustment). In this manner, the darker hues associated with the sky are shown. Emphasis 510A shows faint vertical artifacts, and emphasis 510B shows horizontal artifacts, both of which may result from conventional image interpolation algorithms, in particular bilinear interpolation algorithms, including bilinear interpolation used in CLAHE.

Figure 6:
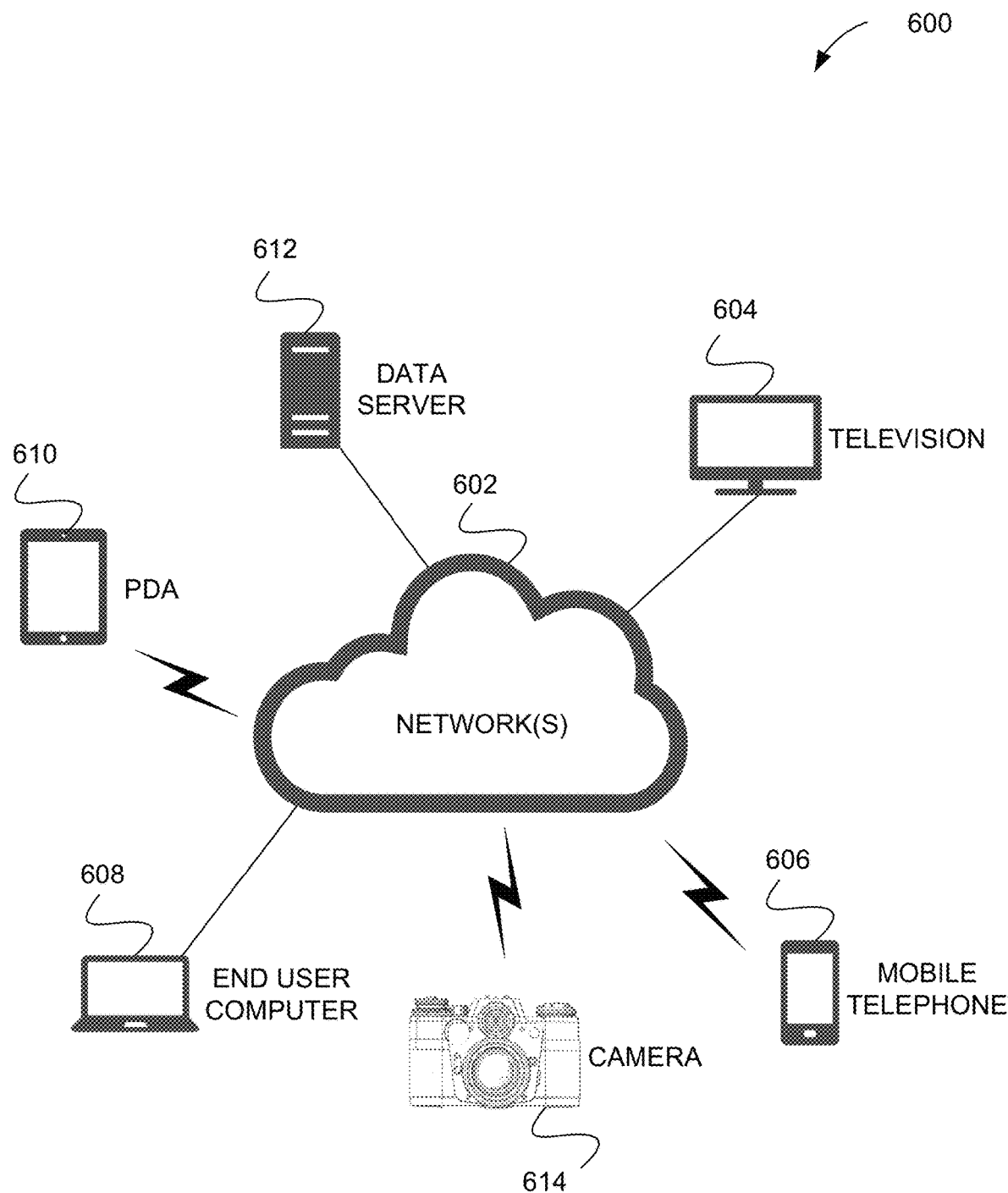
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 612 and an end user computer 608 may be coupled to the network 602 for communication purposes. Such end user computer 608 may include a desktop computer, lap-top computer, and/or any other type of logic. Still yet, various other devices may be coupled to the network 602 including a personal digital assistant (PDA) device 610, a mobile phone device 606, a television 604, a camera 614, etc.

Figure 7:
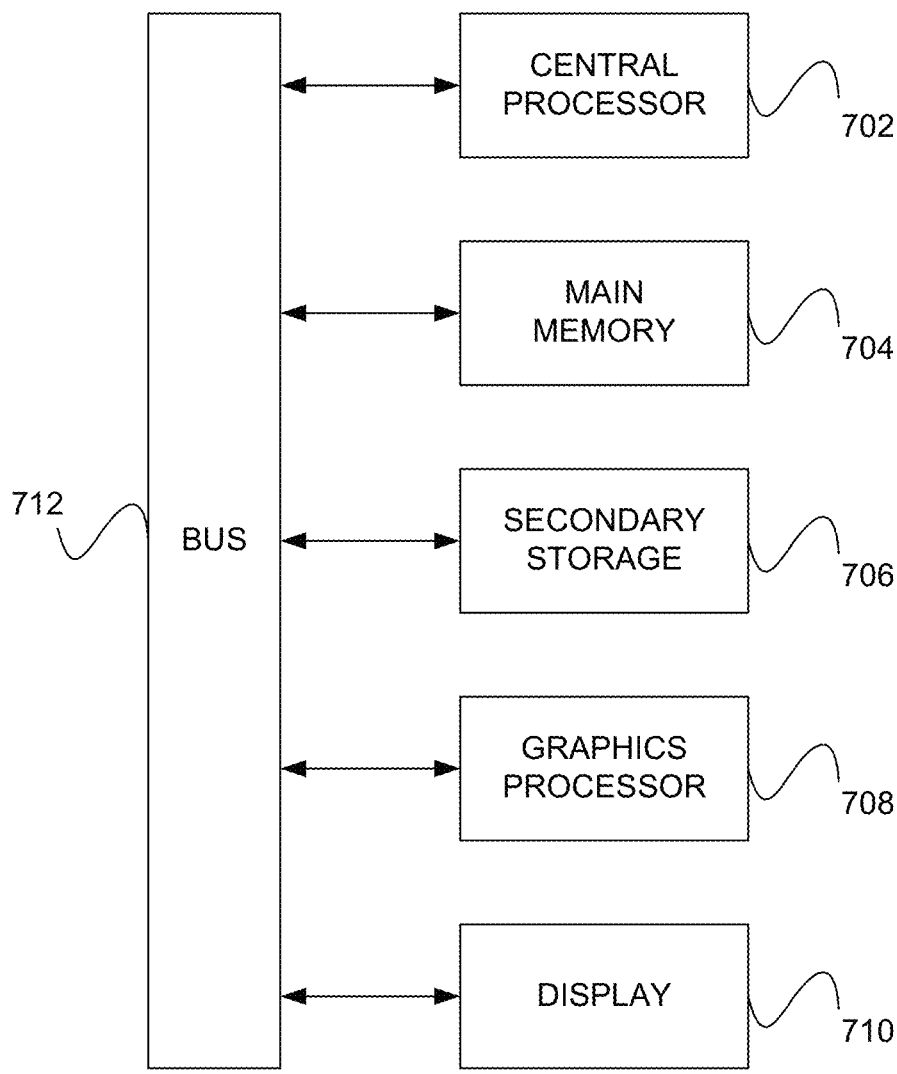
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 702 which is connected to a communication bus 712. The system 700 also includes main memory 704 [e.g. random access memory (RAM), etc.]. The system700 also includes a graphics processor 708 and a display 710.

The system 700 may also include a secondary storage 706. The secondary storage 706 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704, the secondary storage 706, and/or any other memory, for that matter. Such computer programs, when executed, enable the system 700 to perform various functions (as set forth above, for example). Memory 704, storage 706 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVDTM), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A device, comprising:
   a non-transitory memory storing instructions; and
   one or more processors in communication with the non-transitory memory, wherein the one or more processors execute the instructions to:
      compute a first cumulative distribution function for a first histogram of a first pixel region of a first image, wherein the first pixel region is based on a first vertical distance, a second vertical distance, a first horizontal distance, and a second horizontal distance based on a first pixel of the first image;
      extract a first set of parameters for the first cumulative distribution function;
      compute a second cumulative distribution function for a second histogram of a second pixel region of the first image, wherein the second pixel region is based on a third vertical distance, a fourth vertical distance, a third horizontal distance, and a fourth horizontal distance based on a second pixel of the first image;
      extract a second set of parameters for the second cumulative distribution function; and
      create an interpolated cumulative distribution function comprising interpolated parameters calculated by interpolating between the first set of parameters and the second set of parameters; and
      generate a first equalized pixel in a second image based on the interpolated cumulative distribution function.

2. The device of claim 1, wherein the first set of parameters and the second set of parameters each comprise control points.

3. The device of claim 2, wherein the first set of parameters and the second set of parameters further comprise an angle for each control point of the control points.

4. The device of claim 1, wherein the interpolated cumulative distribution function comprises a Bezier curve comprising interpolated control points and interpolated angles.

5. The device of claim 1, wherein the interpolated cumulative distribution function comprises a spline curve comprising interpolated control points.

6. The device of claim 1, wherein the interpolated parameters for the interpolated cumulative distribution function are weighted according to a position of the first input pixel.

7. The device of claim 6, wherein the weighted interpolated parameters are applied horizontally.

8. The device of claim 6, wherein the weighted interpolated parameters are applied vertically.

9. The device of claim 1, wherein during a first processing pass on the first image, the one or more processors execute the instructions to generate and store parameters, including the first and second sets of parameters, for at least the first pixel region of the first image and the second pixel region of the first image.

10. The device of claim 9, wherein the parameters are stored in a texture map.

11. The device of claim 1, wherein the interpolating comprises bicubic interpolation.

12. The device of claim 1, wherein the device is operable such that a first portion of pixel regions of the first image is selected based on a pixel of interest.

13. The device of claim 12, wherein the device is operable such that the pixel of interest is associated with an identified object.

14. The device of claim 13, wherein the device is operable such that a priority associated with the identified object is predetermined.

15. A method, comprising:
   computing, using a processor, a first cumulative distribution function for a first histogram of a first pixel region of a first image, wherein the first pixel region is based on a first vertical distance, a second vertical distance, a first horizontal distance, and a second horizontal distance based on a first pixel of the first image;
   extracting, using the processor, a first set of parameters for the first cumulative distribution function;
   computing, using the processor, a second cumulative distribution function for a second histogram of a second pixel region of the first image, wherein the second pixel region is based on a third vertical distance, a fourth vertical distance, a third horizontal distance, and a fourth horizontal distance based on a second pixel of the first image;
   extracting, using the processor, a second set of parameters for the second cumulative distribution function;
   creating, using the processor, an interpolated cumulative distribution function comprising interpolated parameters calculated by interpolating between the first set of parameters and the second set of parameters; and
   generating, using the processor, a first equalized pixel in a second image based on the interpolated cumulative distribution function.

16. A computer program product comprising computer executable instructions stored on a non-transitory computer readable medium that when executed by a processor instruct the processor to:
   compute a first cumulative distribution function for a first histogram of a first pixel region of a first image, wherein the first pixel region is based on a first vertical distance, a second vertical distance, a first horizontal distance, and a second horizontal distance based on a first pixel of the first image;
   extract a first set of parameters for the first cumulative distribution function;
   compute a second cumulative distribution function for a second histogram of a second pixel region of the first image, wherein the second pixel region is based on a third vertical distance, a fourth vertical distance, a third horizontal distance, and a fourth horizontal distance based on a second pixel of the first image;
extract a second set of parameters for the second cumulative distribution function;
create an interpolated cumulative distribution function comprising interpolated parameters calculated by interpolating between the first set of parameters and the second set of parameters; and
generate a first equalized pixel in a second image based on the interpolated cumulative distribution function.

* * * * *